(12) United States Patent
Greer et al.

(10) Patent No.: US 9,341,911 B2
(45) Date of Patent: May 17, 2016

(54) COLOR RENDERING IN OPTICAL GLAZINGS

(71) Applicant: SAGE Electrochromics, Inc., Faribault, MN (US)

(72) Inventors: Bryan D. Greer, Norhtfield, MN (US); Louis J. Podbelski, Eagan, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 29 days.

(21) Appl. No.: 14/027,731

(22) Filed: Sep. 16, 2013

(65) Prior Publication Data

US 2015/0077829 A1    Mar. 19, 2015

(51) Int. Cl.
*G02F 1/153* (2006.01)
*G02F 1/155* (2006.01)
*G02F 1/15* (2006.01)

(52) U.S. Cl.
CPC .............. *G02F 1/153* (2013.01); *G02F 1/155* (2013.01); *G02F 1/1508* (2013.01)

(58) Field of Classification Search
CPC .... G02F 1/15; G02F 1/155; G02F 2001/1552

USPC .................................................. 359/265–275
See application file for complete search history.

(56) References Cited

U.S. PATENT DOCUMENTS

| | | | |
|---|---|---|---|
| 2007/0121190 A1* | 5/2007 | Meinders et al. | 359/265 |
| 2010/0315693 A1* | 12/2010 | Lam et al. | 359/241 |
| 2012/0147449 A1* | 6/2012 | Bhatnagar et al. | 359/275 |
| 2013/0286460 A1* | 10/2013 | Moriyama et al. | 359/267 |

FOREIGN PATENT DOCUMENTS

| | | | |
|---|---|---|---|
| EP | 2009492 A2 | 12/2008 | |
| JP | S6156640 U | 4/1986 | |
| WO | 9416356 A1 | 7/1994 | |
| WO | WO 2014170241 A2 * | 10/2014 | G02F 1/1533 |

OTHER PUBLICATIONS

International Search Report and Written Opinion for PCT Application No. PCT/US2014/055600, dated Dec. 17, 2014, 9 pages.

* cited by examiner

*Primary Examiner* — Mahidere Sahle
(74) *Attorney, Agent, or Firm* — Abel Law Group, LLP; Robert N Young (57) ABSTRACT

An electrochromic device includes an electrochromic stack. Openings are formed in the electrochromic stack that allow light to pass through without being tinted.

20 Claims, 5 Drawing Sheets

COLOR RENDERING IN OPTICAL GLAZINGS

BACKGROUND OF THE INVENTION

Electrochromic materials and devices have been developed as an alternative to passive coating materials for light and heat management. Such materials and devices have been used in architectural windows, including insulated or active glazing units, and in automobile windows, including windshields and rear-view mirrors. In contrast to passive coating materials, electrochromic devices employ materials capable of reversibly altering their optical properties following electrochemical oxidation and reduction in response to an applied potential. The optical modulation is the result of the simultaneous insertion and extraction of electrons and charge-compensating ions in the electrochemical material lattice.

Figure 1A:
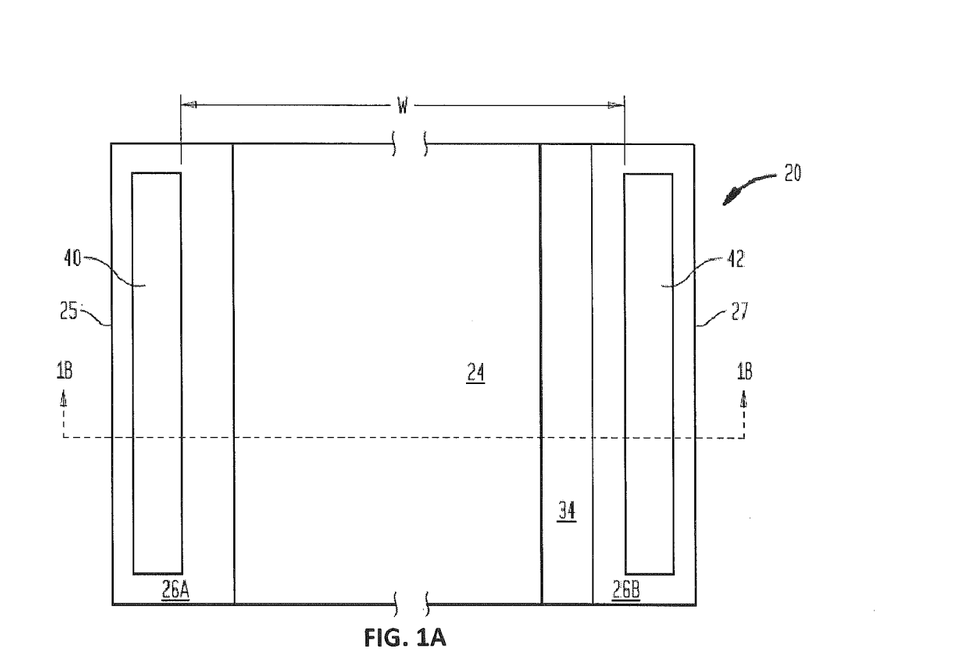
FIG. 1A is a plan view of an electrochromic device.
Figure 1B:
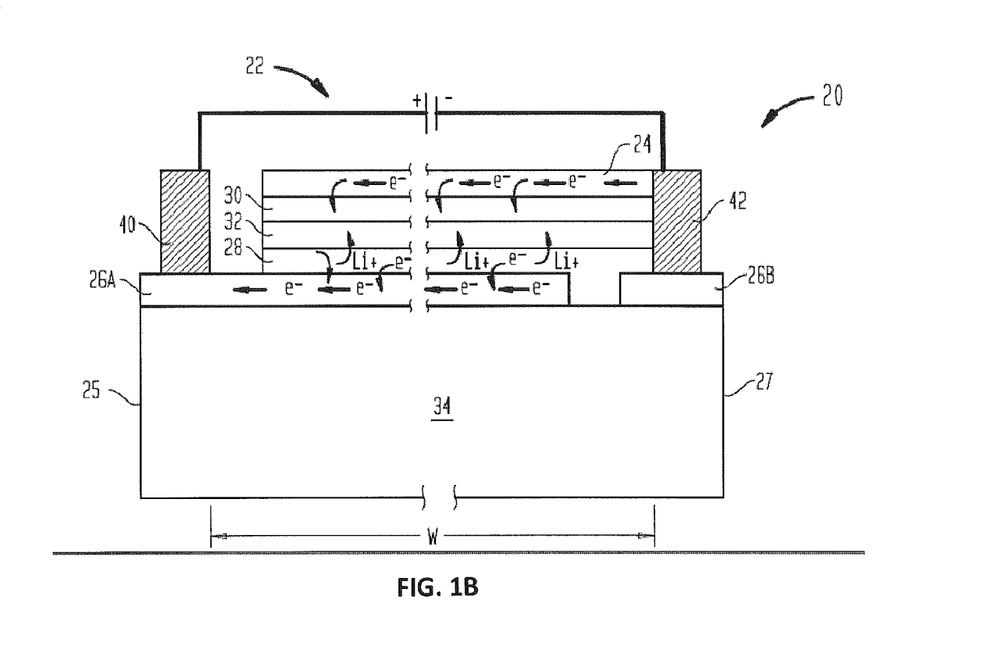
FIG. 1B is a cross-sectional view of the electrochromic device of FIG. 1A at cross-sectional line 1B-1B.

In general, electrochromic devices have a composite structure through which the transmittance of light can be modulated. FIGS. 1A and 1B illustrate plan and cross-sectional views, respectively, of a typical prior art electrochromic device 20. The device 20 includes isolated transparent conductive layer regions 26A and 26B that have been formed on a substrate 34, such as glass or optical glazing. In addition, the device 20 includes a counter electrode layer 28, an ion conductive layer 32, an electrochromic layer 30, and a transparent conductive layer 24, which have been deposited in sequence over the conductive layer regions 26. The counter electrode layer, the ion conductive layer, the electrochromic layer, and the two transparent conductive layers are collectively referred to as an "electrochromic stack." It is to be understood that the relative positions of the electrochromic and counter electrode layers of the device 20 may be interchanged. Further, the device 20 includes a busbar 40 which is in contact only with the conductive layer region 26A, and a busbar 42 which may be formed on the conductive layer region 26B and is in contact with the conductive layer 24. The conductive layer region 26A is physically isolated from the conductive layer region 26B and the busbar 42, and the conductive layer 24 is physically isolated from the busbar 40. Although an electrochromic device may have a variety of shapes, such as one including curved sides, the illustrative, exemplary device 20 is a rectangular device with the busbars 40 and 42 extending parallel to each other, adjacent to respective opposing sides 25, 27 of the device 20, and separated from each other by a distance W. Further, the busbars 40 and 42 are connected by wires to positive and negative terminals, respectively, of a low voltage electrical source 22 (the wires and the source 22 together constituting an "external circuit").

Referring to FIGS. 1A and 1B, when the source 22 is operated to apply an electrical potential across the busbars 40, 42, electrons providing a current flow from the busbar 42, across the transparent conductive layer 24, and into the electrochromic layer 30. In addition, if the ion conductive layer 32 is an imperfect electronic insulator as is the case in many thin film electrochromic devices, a small current, commonly referred to as a leakage current, flows from the busbar 42, through the conductive layer 24 and the electrochromic layer 30, and into the ion conductive layer 32. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. As the current flows away from the busbar 42 across the conductive layer 24 and towards the busbar 40, voltage is dropped by virtue of the finite sheet resistance of the conductive layer 24, which is typically in a range between about 3 and about 20 Ohms/square. In addition, current flowing across the conductive layer 24 is incrementally reduced, as current is drawn through the combination of the layers 30, 32 and 28 ("intermediate stack") to produce the electrochromic coloration in the device 20.

Applying the electrical potential across the busbars 40, 42 may be beneficial for preventing excess light or glare from being transmitted through the optical glazing. However, when the device 20 darkens, light (e.g., daylight) transmitted through the device is filtered according to the spectral properties of the device.

Figure 2:
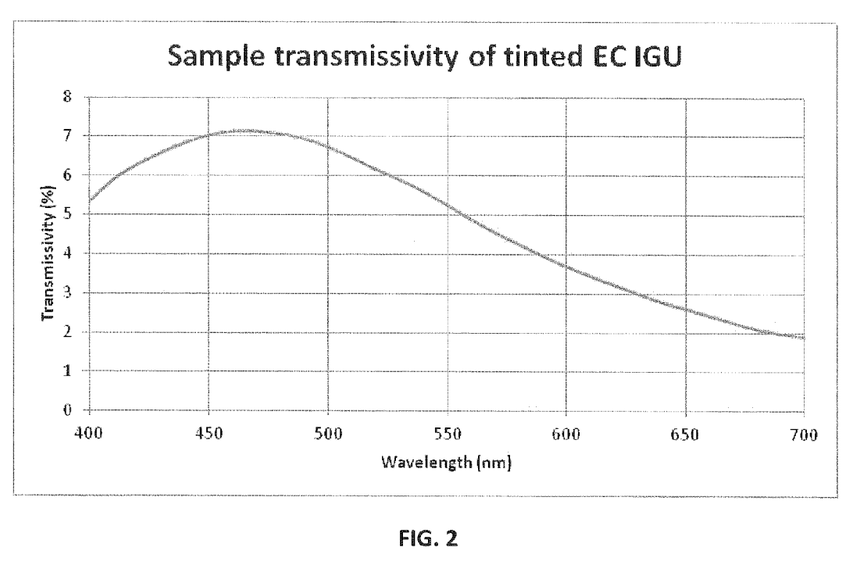
FIG. 2 is a graph illustrating the transmissivity of light waves through an EC IGU having various wavelengths.

As illustrated in the graph shown in FIG. 2, the transmissivity of light through a tinted substrate, such as an electrochromic insulated glazing unit ("EC IGU"), varies based on the wavelength of the light. Accordingly, some wavelengths of light are absorbed or reflected more than others such that the color of light passing through electrochromic glass will be altered. As a result, the view through the optical glazing often takes on an unnatural or unconventional hue, which is often a bluish hue as light waves producing this hue have a higher transmissivity through glass than other light waves. For example, if a view through heavily tinted glass produces a deep bluish hue, such an appearance is due to the glass heavily absorbing green and red portions of the spectrum of light passing through.

Additionally, the light transmitted through the glazing also often takes on such an unnatural, often bluish hue. The perception of such an unnatural hue by viewers is caused by the color saturation, i.e., the intensity of the color of the object being viewed, and the color rendering index (CRI), which is a measure of the ability of a viewer to distinguish between colors under a given light source.

In some situations, some users of such a device, or a vehicle or architectural structure equipped with such a device, find the unnatural blue-tinted appearance of the environment, which may an interior or exterior, viewed through the device to be undesirable, and in some instances even unpleasant. Such users often prefer that the appearance of such an environment be "neutral" (e.g., having an appearance similar to that under natural or ambient light conditions, having an appearance that comports to conventional indoor or outdoor lighting standards, etc.). Also, in some situations, a user in an interior space, such as a vehicle or building interior, may find the tinted appearance of the interior space, as colored by the light passing through the glazing, to be undesirable, and in some instances unpleasant. For example, a tinted hue caused by light passing through electrochromic glass installed in an art museum can alter the look of art to guests within the museum significantly and be considered by the guests as undesirable or unacceptable. Such users or guests could prefer that the appearance of the interior space, such as the museum in the prior example, be "neutral."

Thus, there is a need for a device that prevents excess light or glare from being transmitted through the optical glazing while maintaining the appearance of the environment at an acceptable or pleasing hue, and in some instances at a neutral hue.

BRIEF SUMMARY OF THE INVENTION

To achieve a goal of having a more neutral hue while reducing the level of light passing through a structure, in accordance with one aspect of the invention, portions of the films comprising the electrochromic stack of the electrochromic device may be removed to allow some direct, i.e., undarkened or non-tinted light, to pass through the electrochromic device. In some embodiments, the films having portions removed may include at least one of the electrode layer and the counter electrode layer. In other embodiments, the films having portions removed may include at least one of the electrode layer, counter electrode layer, ion conductor layer, or transparent conductor layer. In such configurations, non-tinted light may be mixed with tinted light passing through the electrochromic device to reduce changes in color intensity and to reduce the bluish hue caused by conventional electrochromic devices during tinting or darkening of such devices.

In accordance with another aspect of the invention, an electrochromic device may include an electrochromic stack that may define one or a plurality of openings. Such openings may allow light to pass through the opening without being tinted.

In some arrangements, the opening or openings defined by the electrochromic stack may define a line or plurality of lines, respectively. In some arrangements, at least some of the openings defined by the electrochromic stack may define a set of parallel lines.

In some arrangements, at least some of the plurality of openings defined by the electrochromic stack may be arranged in a random pattern. In some arrangements, at least some of the plurality of openings defined by the electrochromic stack may be a set of round holes arranged in a pattern of uniformly spaced-apart dots. In some arrangements, at least some of the plurality of openings defined by the electrochromic stack may be spaced-apart holes arranged in a linear pattern.

In some arrangements, at least some of the plurality of openings defined by the electrochromic stack may be a first set of spaced-apart holes defining a first linear pattern and a second set of spaced-apart holes defining a second linear pattern. In some such arrangements, the first and second sets of spaced-apart holes may be spaced from each other such that the defined first and second linear patterns are spaced equally from each other.

In another aspect in accordance with the present invention, a process for neutralizing the color intensity of tinted light may be provided. Such a process may include a step of applying a first layer onto one of (i) a transparent or translucent substrate and (ii) a second layer overlying the substrate. The process may further include a step of tinting the first layer. The process may further include a step of removing at least one portion within the first layer to define one or a plurality of openings to allow light to pass through the opening without being tinted.

In some arrangements, the first layer may be applied onto the one of the substrate and the second layer prior to the tinting of the first layer. In some arrangements, the first layer may be tinted to a first shade prior to being applied onto the substrate. In some such arrangements, the the first layer may be tinted to a second shade different from the first shade after being applied to the one of the substrate and the second layer.

In some arrangements, the first layer may be an electrochromic layer. In some such arrangements, the first layer may be tinted by applying an electric potential across the electrochromic layer.

In some arrangements, the removed portions of the first layer may have extended through the thickness of the tinted layer prior to being removed.

In some arrangements, the opening or openings defined by the first layer may define a line or plurality of lines, respectively. In some arrangements, at least some of the openings defined by the first layer may define a set of parallel lines.

In some arrangements, at least some of the plurality of openings defined by the first layer may be arranged in a random pattern. In some arrangements, at least some of the plurality of openings defined by the first layer may be a set of round holes arranged in a pattern of uniformly spaced-apart dots. In some arrangements, at least some of the plurality of openings defined by the first layer may be spaced-apart holes arranged in a linear pattern.

In some arrangements, at least some of the plurality of openings defined by the first layer may be a first set of spaced-apart holes defining a first linear pattern and a second set of spaced-apart holes defining a second linear pattern. In some such arrangements, the first and second sets of spaced-apart holes may be spaced from each other such that the defined first and second linear patterns are spaced equally from each other.

In some arrangements, the first layer may be tinted to a shade darker than the substrate.

In some arrangements, the first layer may be an electrochromic stack. In some such arrangements, the electrochromic stack may include at least an ion conductive layer that may be applied against and bounded by both a first side of an electrochromic layer and a first side of a counter electrode layer. In some such arrangements, a second side of the electrochromic layer may be applied against and bounded by a first conductive layer. In some such arrangements, a second side of the counter electrode layer may be applied against and bounded by a second conductive layer. In some such arrangements, the first layer may be tinted by applying an electric potential across the electrochromic stack.

DETAILED DESCRIPTION

Figure 3:
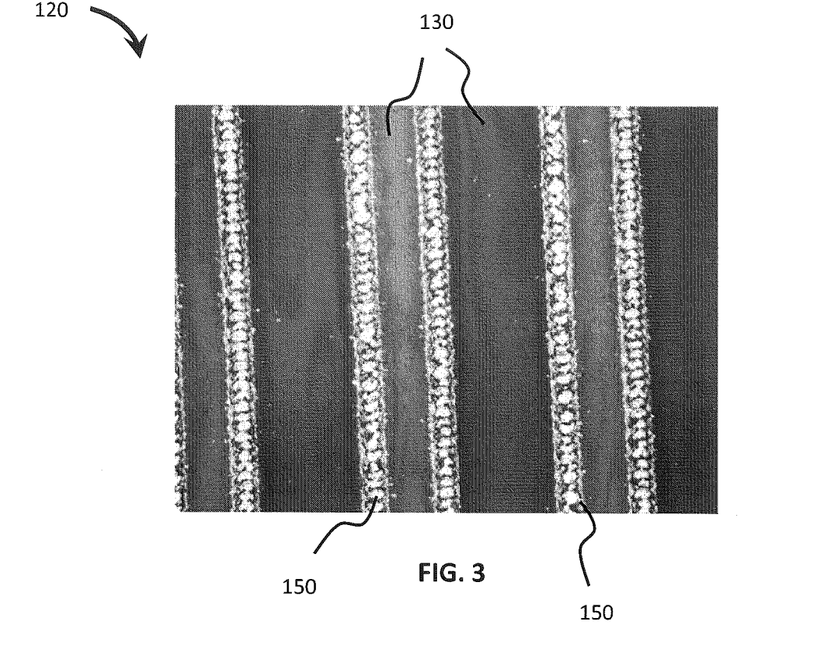
FIG. 3 is a photograph of a portion of an electrochromic device, at high magnification, in which portions of an electrochromic stack have been removed in continuous stripes, in accordance with an embodiment.

Referring to FIG. 3, an electrochromic device 120 in accordance with an embodiment may be substantially similar to the electrochromic device 20 shown in FIGS. 1A and 1B. In FIG. 3, an electrochromic stack 130 of the electrochromic device 120 may include the set of films specified with respect to FIG. 1 as being deposited on the substrate. As shown in FIG. 3, the electrochromic stack 130 may define a plurality of openings 150 that may extend through the entire thickness of the electrochromic stack 130 or, in some arrangements, through only some of the films defining the electrochromic stack 130 during processing of the stack. In this manner, the electrochromic stack 130 may allow light to pass through the openings 150 defined by the electrochromic stack 130 in which such light may be unobstructed by the films defining the electrochromic stack.

Due to the openings 150, the electrochromic device 120 may allow a greater total amount of light to pass through than electrochromic devices, such as the device 20, without such openings. Accordingly, a fully tinted state of the electrochromic device 120 may not darken light passing through the device as much as the fully tinted state of the electrochromic device 20. However, the electrochromic device 120 may be more neutral in either or both color intensity and viewer perception than the electrochromic devices without openings.

As further shown in FIG. 3, the plurality of openings 150 may be formed as lines or stripes across at least a portion of the electrochromic layer 120. The stripes may be, but are not limited to being, formed by laser ablation applied to regions, which may be predetermined, of the electrochromic stack 130. For example, a pulse of such a laser may produce a series of small holes that may be seen at high magnification such as in FIG. 3, that collectively form the openings. However, such a series of small holes appears as a continuous line, i.e., an opening, without magnification. When formed by laser ablation, the plurality of openings 150 may be approximately 0.001 inches in width.

In some arrangements, a laser or other process may be used to create openings through the entire electrochromic stack 130 such that each of the films of the electrochromic stack are penetrated. In this manner, light may pass through the openings defined by the electrochromic stack 130 without being tinted or darkened, while at the same time light passing through the remaining portions of the electrochromic stack 130 may be tinted. In preferred embodiments, each of the openings may be electrically isolated from each other.

In preferred arrangements, the dimension of the openings through the additional layers may very closely correspond to the dimensions of the openings measured with the planes of previously prepared layers, in this example, the transparent conductive layer and the electrochromic layer. Maintaining consistent openings among the layers of the electrochromic stack may prevent shorting or other electrical leakage problems.

Figure 4:
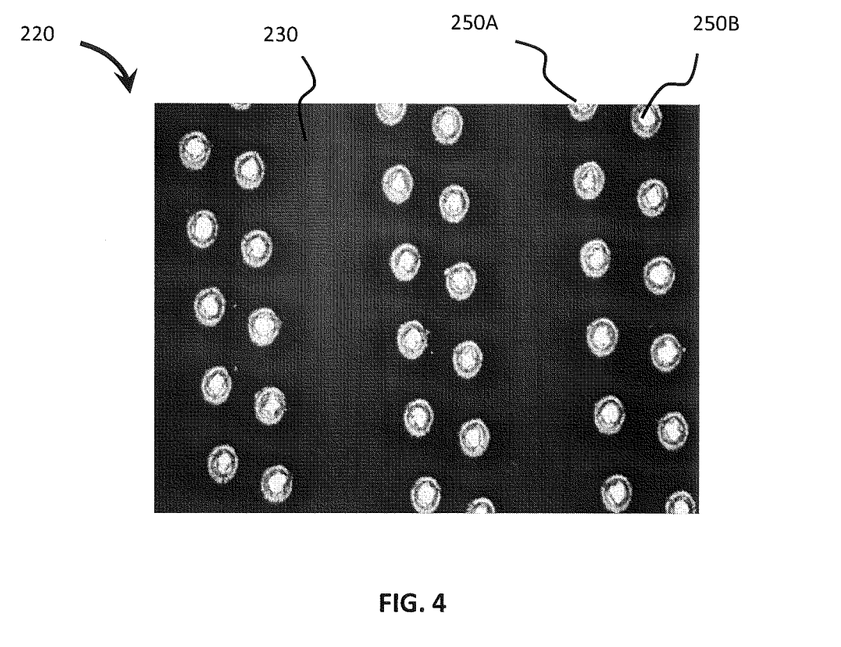
FIG. 4 is a photograph of a portion of an electrochromic device, at high magnification, in which portions of an electrochromic stack have been removed in spaced-apart sets of discontinuous lines having offset holes therebetween, in accordance with an embodiment.

Referring now to FIG. 4, an electrochromic device 220 may be substantially similar to the electrochromic device 120 shown and described with respect to FIG. 3 with some notable exceptions. In the example of FIG. 4, the electrochromic device 220 may include an electrochromic stack 230 that may define a first set of spaced-apart holes 250A defining a first linear pattern and a second set of spaced-apart holes 250B defining a second linear pattern. The first and second sets of spaced-apart holes may be spaced from each other such that the defined first and second linear patterns are spaced equally from each other. Moreover, in some arrangements, as shown, the first and second linear patterns may be repeated in other regions of the electrochromic stack 230. As further shown, the repeated first and second linear patterns as a whole may be spaced farther from other first and second linear patterns than the first and second linear patterns are from each other.

Figure 5:
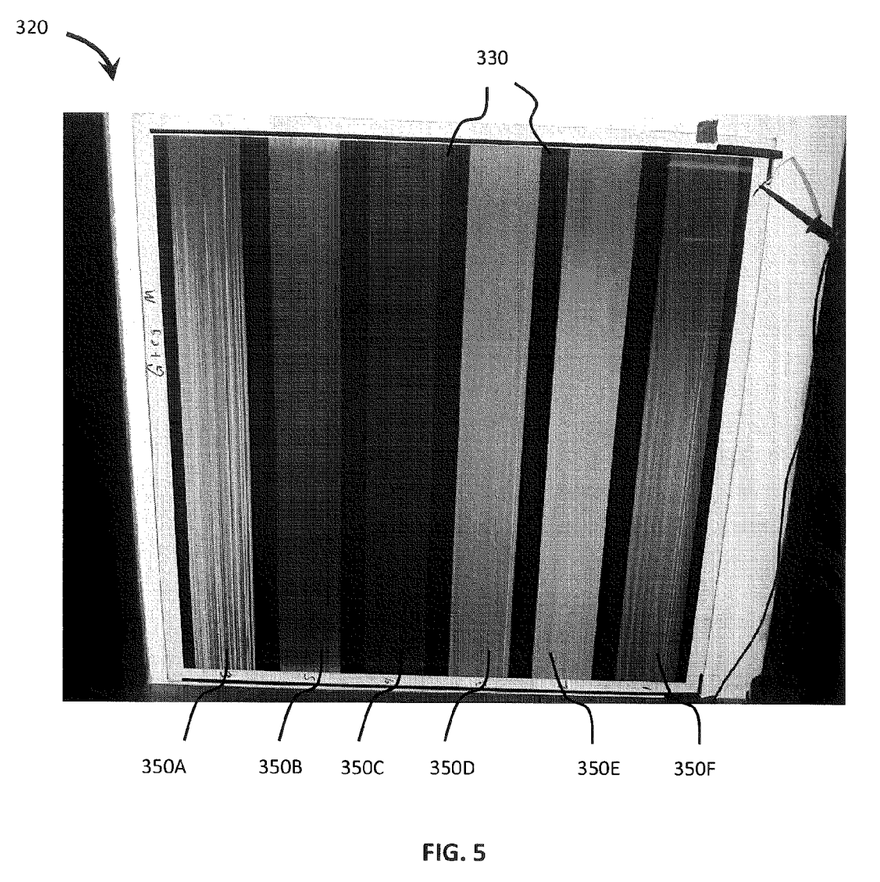
FIG. 5 is a photograph of an electrochromic glass pane in which portions of an electrochromic stack have been removed by different amounts at different portions of the glass and not removed at all in some areas, in accordance with an embodiment.

As can be seen clearly in the example of FIG. 3 and even more clearly in FIG. 5, stripes formed by the plurality of openings may be spaced apart by differing widths to create different patterns, thus allowing more or less light through various respective regions of the electrochromic layer. As shown in FIG. 5, in particular, an electrochromic device 320, which may be a framed sheet of electrochromic glass, may include an electrochromic stack 330 defining openings 350A-350F, which may be stripes or spaced-apart holes in a dot or hole pattern, as described previously herein with respect to FIGS. 3 and 4. As in the arrangement shown, the openings 350A-350F may be formed by laser ablation of the electrochromic layer 330.

In some arrangements, the openings 350A-350F may be created by removing portions of the films simultaneously while in other arrangements, the openings may be created by removing portions of only some of the films as they are deposited on the substrate or layers overlying the substrate. In some arrangements, with appropriate laser equipment known to those skilled in the art portions of the electrochromic stack could be removed by laser ablation at various predetermined locations which may be at only specific zones of the electrochromic device or which may be at zones throughout the entire electrochromic device. In some arrangements, a single electrochromic device could contain multiple independently controllable zones, where one zone includes openings in the electrochromic stack described herein, thus allowing some light to pass through without being tinted or darkened, while a second zone does not include any openings and thus only allows tinted light to pass through. In this manner, any controlled zone, whether with or without openings, may be tinted one or both by a different amount and during a different time period than any other controlled zone.

Figure 6:
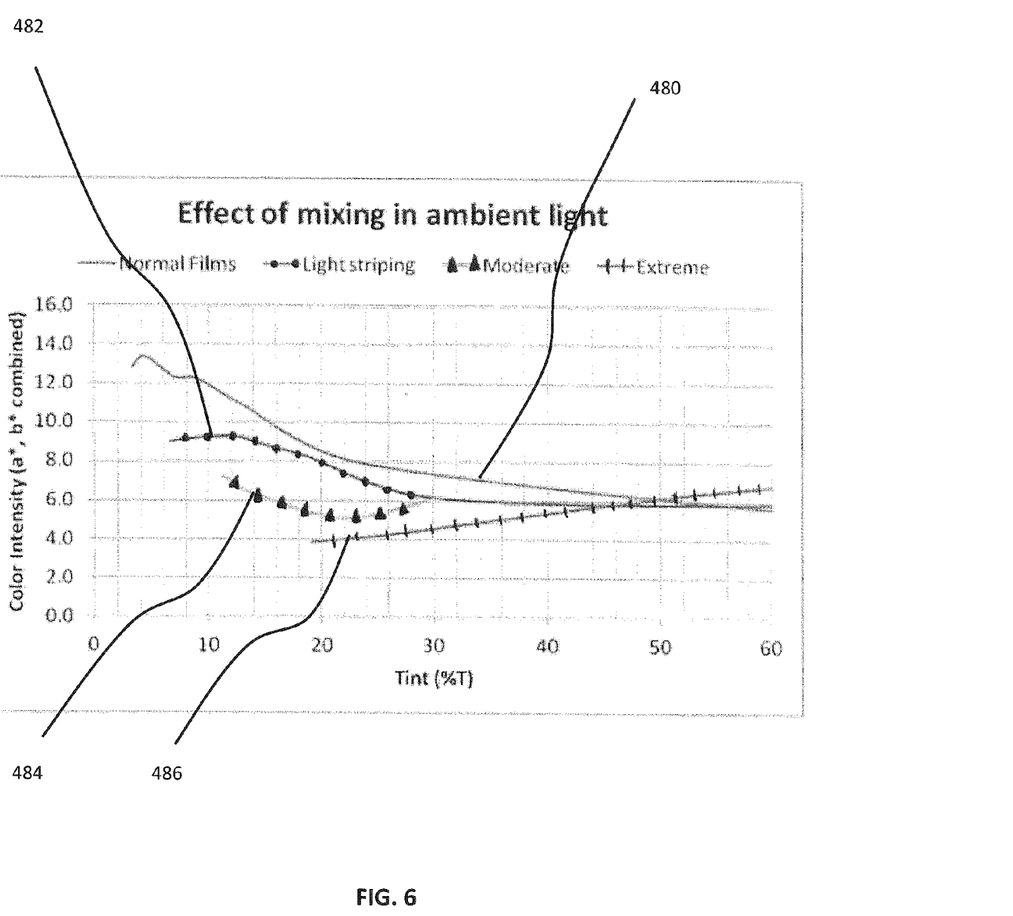
FIG. 6 is a graph illustrating the intensity of the color of light passing through electrochromic films having various degrees of film removal as the films are altered between fully clear and fully tinted states.

As shown in the graph of FIG. 6, the color intensity of light passing through the electrochromic film varies with the level of darkening or tinting of electrochromic films, such as the films of the electrochromic devices 20, 120, 220, and 320, as well as with the degree or amount of film removal from the electrochromic device. In particular, the graph shows the relative average color intensities for electrochromic films between fully clear and fully tinted states, in particular for a normal film 480 having no film removal, a lightly striped film 482, a moderately striped film 484, and an extremely striped film 486.

For example, the normal film 480 may have a drop in color intensity from approximately 13.0 in a fully clear state to approximately 6.0 in a fully tinted state whereas the extremely striped film 486 may have a gain in color intensity from approximately 4.0 in a fully clear state to approximately 7.0 in a fully tinted state. As the difference between the fully clear and fully tinted states of the extremely striped film 486 is substantially less than for the normal film 480, the extremely striped film 486 may be said to be substantially more "neutral" than the normal film 480.

As further shown in FIG. 6, for tint levels greater than approximately 30%, each of the lightly striped film 482 and the moderately striped film 484 provide a constant color intensity of approximately 6.0. Accordingly, for these tint levels, the films 482, 484 may provide the most neutral hues.

Still referring to FIG. 6, the degree of film removal may limit the ability to tint at lower levels of light. For instance, as shown, the extremely striped film 486 may provide tinting of the light only when the film is set to tint at levels greater than approximately 20% light transmittance. In contrast, the normal film 480 may provide tinting of the light when the film is set to tint at levels greater than approximately 5% of light transmittance. Accordingly, the desirable amount of film to be removed from electrochromic devices may be less for applications requiring either or both higher reductions of light and solar heat than those not having such requirements.

Although the film removal process has been described previously herein with respect to laser ablation, it is to be understood that other processes may be used to form the openings within the layers of the electrochromic device, including within the electrochromic layer. Other such processes that may be used to form these openings may include, but are not limited to, acid etching, stamping, or other processes known to those of ordinary skill in the art.

Although the openings defined by the layers of the electrochromic devices described previously herein have been described with respect to certain dimensions and patterns, it is to be understood that the openings may have any of other dimensions and patterns provided that the objectives of the present invention are met. In this manner, the quantity of openings, the dimensions of the openings and the spacing between the openings are all variables that may be altered to allow more or less light to pass through the device for compensating for the undesirable hue that may be created without such openings, as described previously herein. For example, other shapes of openings may include, but are not limited to, circles, ovals, triangles, star, crescent, and rectangles, and any combination thereof. Other patterns may include, but are not limited to, lines or stripes, parallel lines or stripes, holes or dots, and randomly placed shapes.

In an alternative embodiment, a tinted layer other than an electrochromic stack may be applied to a transparent or translucent substrate. In some such arrangements, the tinted layer may define openings, such as the openings described previously herein, such that light passing through the openings of the tinted layer and then through the substrate does not become tinted.

Although the invention herein has been described with reference to particular embodiments, it is to be understood that these embodiments are merely illustrative and not exhaustive of the principles and applications of the present invention. Thus, various features of one embodiment, configuration, arrangement, or example may be interchanged with features of another embodiment, configuration, arrangement, or example disclosed previously herein. For instance, openings of an electrochromic stack shown and described with respect to one figure may be combined or replaced with openings of an electrochromic layer shown and described with respect to another figure in an alternative arrangement that is fully encompassed by the present invention. It is therefore to be understood that numerous modifications may be made to the illustrative embodiments and that other arrangements may be devised without departing from the spirit and scope of the present invention as defined by the appended claims.

The invention claimed is:

1. A window comprising:
an electrochromic device comprising an electrochromic stack defining a plurality of openings defining a line to allow light to pass therethrough without being tinted, wherein the window includes the electrochromic device, and wherein tintable portions of the electrochromic device are disposed on both sides of the line, and wherein the electrochromic device comprises a substantially same thickness on both sides of the line.

2. The window of claim 1, wherein the plurality of openings extend through an entire thickness of the electrochromic device.

3. The window of claim 1, wherein the plurality of openings define a second line, and wherein tintable portions of the electrochromic device are disposed on both sides of the second line.

4. The window of claim 1, wherein the line is disposed in a visible portion of the first layer.

5. The window of claim 1, wherein the plurality of openings of the electrochromic stack is a set of round holes.

6. The window of claim 1, wherein at least some of the openings are spaced-apart holes arranged in a linear pattern.

7. The window of claim 1, wherein at least some of the openings are a first set of spaced-apart holes defining a first linear pattern and a second set of spaced-apart holes defining a second linear pattern, the first and second sets of spaced-apart holes being spaced from each other such that the defined first and second linear patterns are spaced equally from each other.

8. A method of neutralizing the color intensity of tinted light, the method comprising:
applying a first layer onto one of (i) a transparent or translucent substrate and (ii) second layer overlying the substrate; then
tinting the first layer; and
removing portions within the first layer to define a plurality of openings defining a line to allow light to pass therethrough without being tinted,
wherein a window includes the substrate and the first layer, wherein tintable portions of the first layer are disposed on both sides of the line, and wherein the plurality of openings extend through an entire thickness of the electrochromic device.

9. The method of claim 8, wherein the first layer is tinted to a first shade prior to being applied onto the substrate, and wherein the tinting tints the first layer to a second shade different from the first shade.

10. The method of claim 8, wherein the first layer is an electrochromic layer, and wherein the first layer is tinted by applying an electric potential across the electrochromic layer.

11. The method of claim 8, wherein the removed portions of the first layer extended through the thickness of the tinted layer prior to being removed.

12. The method of claim 8, wherein applying the first layer forms an electrochromic stack, and wherein at least one of the plurality of openings extends entirely through the electrochromic stack.

13. The method of claim 8, wherein the line is disposed in a visible portion of the first layer.

14. The method of claim 8, wherein the plurality of openings appear as a continuous line when viewed without magnification.

15. The method of claim 8, wherein removing portions within the first layer is performed by a laser.

16. The method of claim 8, wherein removing portions within the first layer further comprises removing additional portions within the first layer to define a second plurality of openings defining a second line, and wherein tintable portions of the first layer are disposed on both sides of the second line.

17. The method of claim 8, wherein the tintable portions of the first layer have a substantially same thickness on both sides of the line.

18. The method of claim 8, wherein the first layer is an electrochromic stack, the electrochromic stack including at least an ion conductive layer applied against and bounded by both a first side of an electrochromic layer and a first side of a counter electrode layer, a second side of the electrochromic layer being applied against and bounded by a first conductive layer, and a second side of the counter electrode layer being applied against and bounded by a second conductive layer, and wherein the first layer is tinted by applying an electric potential across the electrochromic stack.

19. The window of claim 1, wherein the window is an architectural window or an automobile window.

20. A window comprising:
an electrochromic device comprising an electrochromic stack defining a plurality of openings defining a line to allow light to pass therethrough without being tinted, wherein the window includes the electrochromic device, and wherein tintable portions of the electrochromic device are disposed on both sides of the line, and wherein the plurality of openings extend through an entire thickness of the electrochromic device.

* * * * *